TAPE TRANSPORT

Filed July 29, 1968 4 Sheets-Sheet 1

INVENTORS
RONALD J. BOWMAN,
ALEXANDER E. HINE
BY Thomas E. Schatzel
ATTORNEY

INVENTORS
RONALD J. BOWMAN,
ALEXANDER E. HINE
BY Thomas E. Schatzel
ATTORNEY

INVENTORS
RONALD J. BOWMAN,
ALEXANDER E. HINE
BY Thomas C. Schatzel
ATTORNEY

INVENTORS
RONALD J. BOWMAN,
ALEXANDER E. HINE
BY Thomas C. Schatzel
ATTORNEY 3,529,787
TAPE TRANSPORT Ronald James Bowman, Beechfield, and Alexander Edward Hine, Bracknell, England, assignors to Ampex Corporation, Redwood City, Calif., a corporation of California Filed July 29, 1968, Ser. No. 748,438
Claims priority, application Great Britain, Sept. 19, 1967, 42,643/67
Int. Cl. B65h *59/38, 63/02;* G03b *1/04*
U.S. Cl. 242—189 10 Claims

ABSTRACT OF THE DISCLOSURE

A magnetic tape transport having a tape drive capstan arranged to drive a tape between two reels with a reel supplying tape rotated by the tape and a take-up reel receiving tape rotated by a drive motor coupled thereto through a slipping clutch mechanism. A locking means is operated to lock the clutch drive and driven members relative to each other and provide direct drive between the drive motor and take-up reel.

This invention relates to tape transports and is particularly directed, although not necessarily limited, to a magnetic tape transport adapted for and intended for use in a portable tape recorder.

One aspect of the present invention is concerned with the driving of the take-up reel to ensure that it accepts tape from the capstan at a constant rate. In order to save power, particularly in battery operated portable recorders, it is convenient to provide a single motor for driving both the capstan and the take-up reel. However, since the capstan will be rotating at constant speed, so will the motor and so will be the drive mechanism to the take-up reel. Due however to the changing radius of the tape stack, the angular speed of the reel must continually vary for it to accept tape at a constant rate. This problem may be overcome by the provision of a slipping clutch between the motor and the reel.

According therefore to this aspect of this invention, in a magnetic tape transport having a tape drive capstan arranged to drive a tape, a drive motor for driving said capstan and also for driving a take-up reel which accepts tape from the capstan, there is provided slipping clutch in the drive from the motor to the take-up reel. The take-up reel will be driven until a given load torque is applied to the turntable, whereupon the clutch will slip. Normally the motor will provide a constant speed drive and the load torque will be provided by the tape. Accordingly, the rotational speed of the turntable will be governed by the rate at which the tape is driven by the capstan and the diameter of the tape stack. The tape will be traveling at a constant rate and the rotational speed of the take-up reel and the tape tension will fall as the tape stack's diameter increases.

A further aspect of this construction is concerned where fast "wind" or "rewind" modes are to be provided for the tape transport. In order to achieve maximum spooling rate the tape must be driven via the reels and not the capstan. Under these conditions, a fast wind mode is prevented by the slipping clutch which has in this mode insufficient torque to drive the tape and accordingly there may be provided means for locking the clutch when the tape transport is put into a fast wind mode.

Yet another aspect of the present invention is concerned with the bi-directional drive to the reels. The drives to the reels may be arranged so that they transmit power only in one direction of rotation and will free-wheel when rotated in the opposite sense. This permits the simplification of the drive apparatus.

The accompanying drawings illustrate a tape transport constructed in accordance with the invention. In the drawings.

Figure 1:
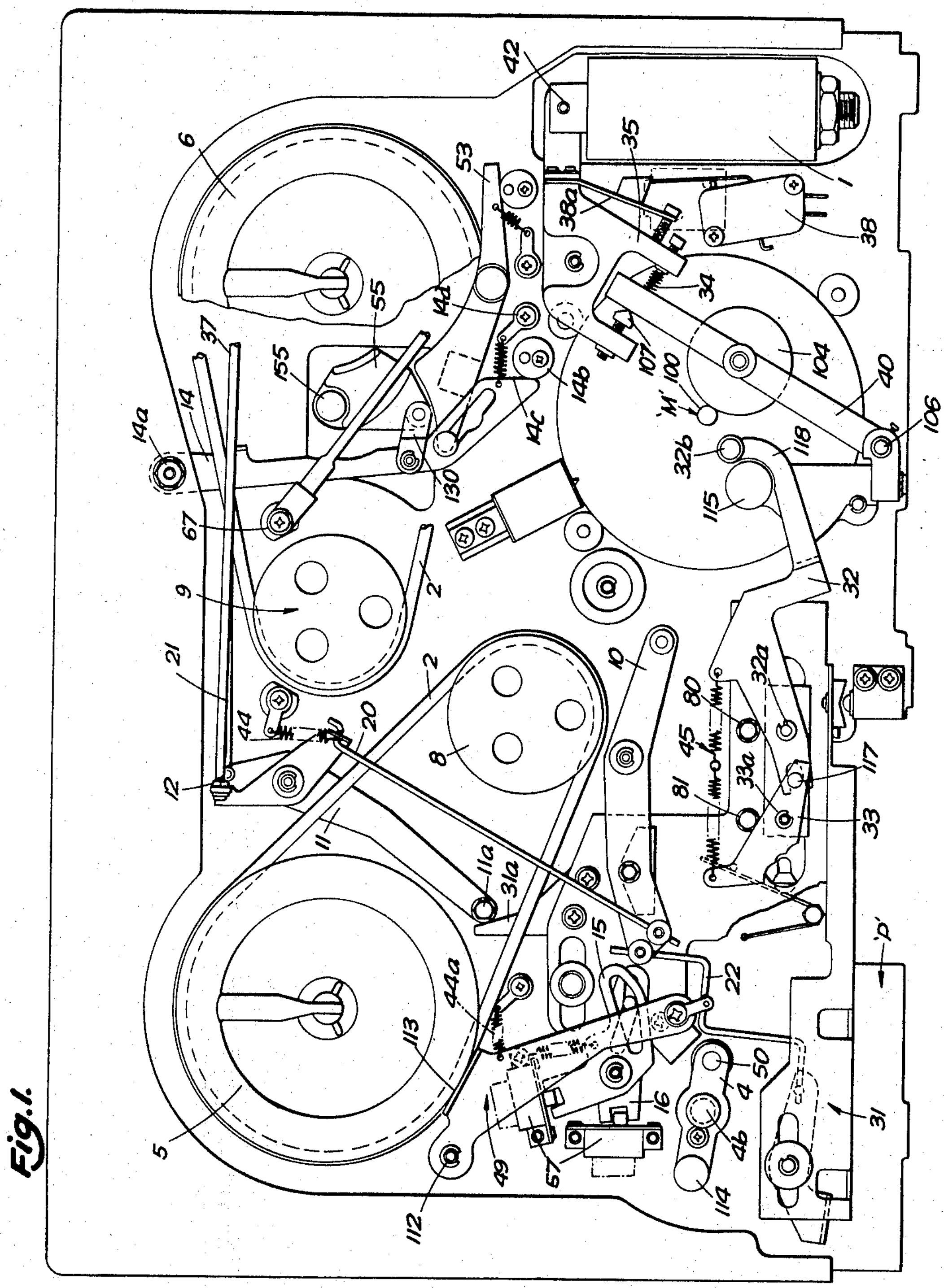
FIG. 1 shows in detail in plan view a transport in accordance with the invention.

Referring to these figures, there is provided a single drive motor M whose shaft 100 acts as the capstan for the tape in order to drive the tape past a recording and reproducing head 101. The motor M is coupled to the multiple drive pulleys 8 and 9 by means of a single drive belt 102 so that both pulleys are rotated in the same direction by the motor 100. Drive belts 2 couple the motion of the pulleys 8 and 9 to the supply turntable 5 and the take-up turntable 6 respectively. The turntables 5 and 6 each incorporate a slipping clutch (of previous mention) and the pulleys are arranged to transmit power in one direction of rotation only and will free-wheel when rotated in the opposite sense. Thus, depending on the direction of rotation of the motor, rotational power is applied either to the take-up turntable 6 or the supply turntable 5. The detailed construction of the drive pulleys will be discussed hereinafter.

Figure 2:
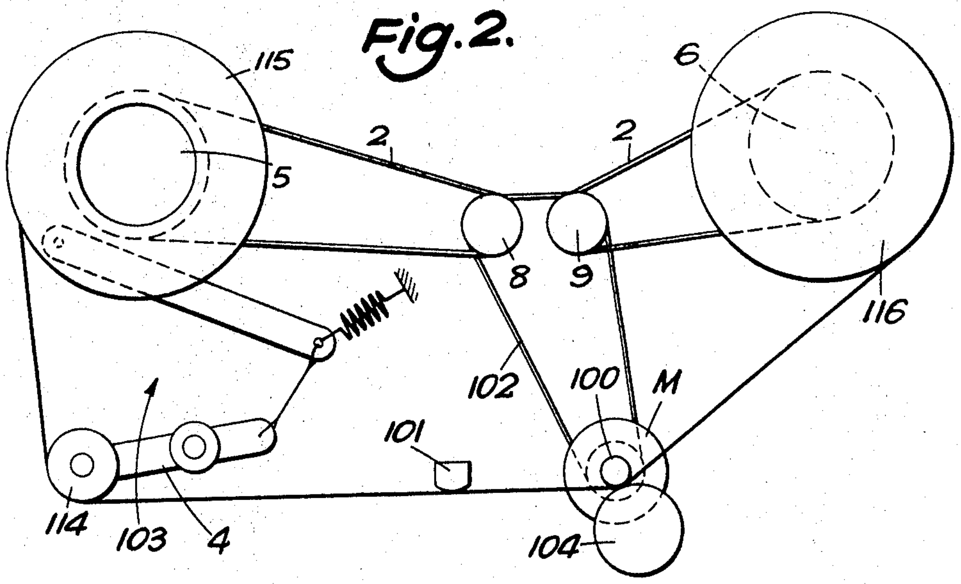
FIG. 2 shows the main features of the transport of FIG. 1 in diagrammatic form.

Tape tension in the forward modes is provided by a mechanical braking system shown generally as 103 in FIG. 2. This braking system also acts as a stop brake to bring the tape to rest after it has been traveling in one of the forward modes and this is described in greater detail hereinafter.

In the rewind mode, tape tension is provided by frictional torque applied to the turntable 6 and for this mode a separate stop brake which includes a brake band 37 passing round a groove on the turntable is provided. The brake band is anchored at one end 67 and is anchored at the other end to a member 12. It will be appreciated that tension is only applied to this reel during rewind and the mechanism for doing this will also be described hereinafter.

SELECTION OF PLAY MODE

To put the recorder into the "play" mode, a key is depressed on the front panel of the machine, thereby operating a switch to apply power to the motor M and to the solenoid 1. The solenoid is operable to bring the pinch roller 104 into contact with the capstan 100. The plunger of the solenoid is pivoted at 42 to the pivoted connecting arm 35 which when the solenoid is actuated rotates in a clockwise direction. The pinch roller is mounted on arm 40 which is pivoted at one end at the pivot 106 and which at its other end is engaged by the stop 107 and arm 35. This end of the arm 40 is held between the stop, which is adjustable, and the spring 34. As the solenoid is actuated and during the initial travel of the arms 35 and 40 the gap occupied by the spring remains essentially constant and there is no appreciable change in the initial tension in the spring. This ensures that the force required from the solenoid while closing the gap between the capstan and pinch roller remains essentially constant. Upon engagement of the pinch roller with the capstan the arm 35 continues to move under the force applied by the solenoid and the adjustable stop comes out of contact with the arm 40. At this point the pressure of the spring is applied to the end of the arm 40 to maintain a good contact between the pinch roller and the capstan. Thus the requisite pressure to prevent tape slippage is only applied between the pinch roller and the capstan when the solenoid has reached the end of its stroke.

To reduce current drain on the power supply to a minimum, the solenoid is preferably provided with two windings. One winding produces the initial pulling force and the other winding maintains the required hold. A switch 38 actuated by an adjustable leaf 38*a* attached to arm 35 switches the power from one winding to the other just before the solenoid is fully retracted.

FAST MODE SELECTION

A fast mode (wind or rewind) is selected by movement of a fast mode plate 31 rightwards or leftwards. This movement is transmitted via the link 22, pivoted lever 10 and link 20 to pivoted lever 12. This lever is normally biased by a spring 44 to retain tension in the brake band 37 which passes round the turntable 6. Selection of a fast mode by movement of plate 31 rotates level 12 against the force of spring 44 to release the tension in the band 37.

The selection of a fast mode also requires that the tape be lifted from the capstan.

In normal operation, the tape lies along a path from the supply reel, over guide 114 (to be described) past transducer head 101, and over guide post 115 and motor M to the take-up reel. To lift the tape from the capstan, arm 32, which is mounted on pivot pin 32*a*, is rotated clockwise to replace the bearing surface of the guide post 115 with the surface of post 32*b* at the end of arm 32. Pivoted on a pivot pin 33*a* is an arm 33 (similar to arm 32) whose right hand end bears a pin 117 engaging an end slot in arm 32 and whose left hand end is linked to the arm 32 by a spring 45 so that the arm 32 is biased in an anticlockwise direction, being held as shown in the drawing by the lower part of post 115. The pivot pins 32*a* and 33*a* are fixed to the base plate P and are therefore stationary. The plate 31 carries a pair of spaced upright rollers 80 and 81 one of which (depending on the direction of movement of the plate 31) bears against arm 32 or 33 to rotate both arms such that their end posts (32*b* on arm 32) move to lift the tape together away from the capstan.

SLIPPING CLUTCH DRIVE

In the play or record mode the motor is rotating in an anti-clockwise direction driving the tape via the capstan and at the same time supplying power to the take-up reel 6. Since the motor is rotating at a constant speed tape is being supplied to the take-up reel at a constant rate. Similarly, the drive pulley on the take-up turntable is being driven by the motor at a constant speed. However, due to the changing radius of the tape stack, the angular speed of the reel must continually vary for it to accept tape at a constant rate.

Therefore a slipping clutch is provided between the turntable and the drive pulley. No similar clutch is required for the supply reel since the motor is dis-engaged by virtue of the drive pulley 8 being in its free-wheel condition and the supply unit will be driven by the tape.

Figure 3:
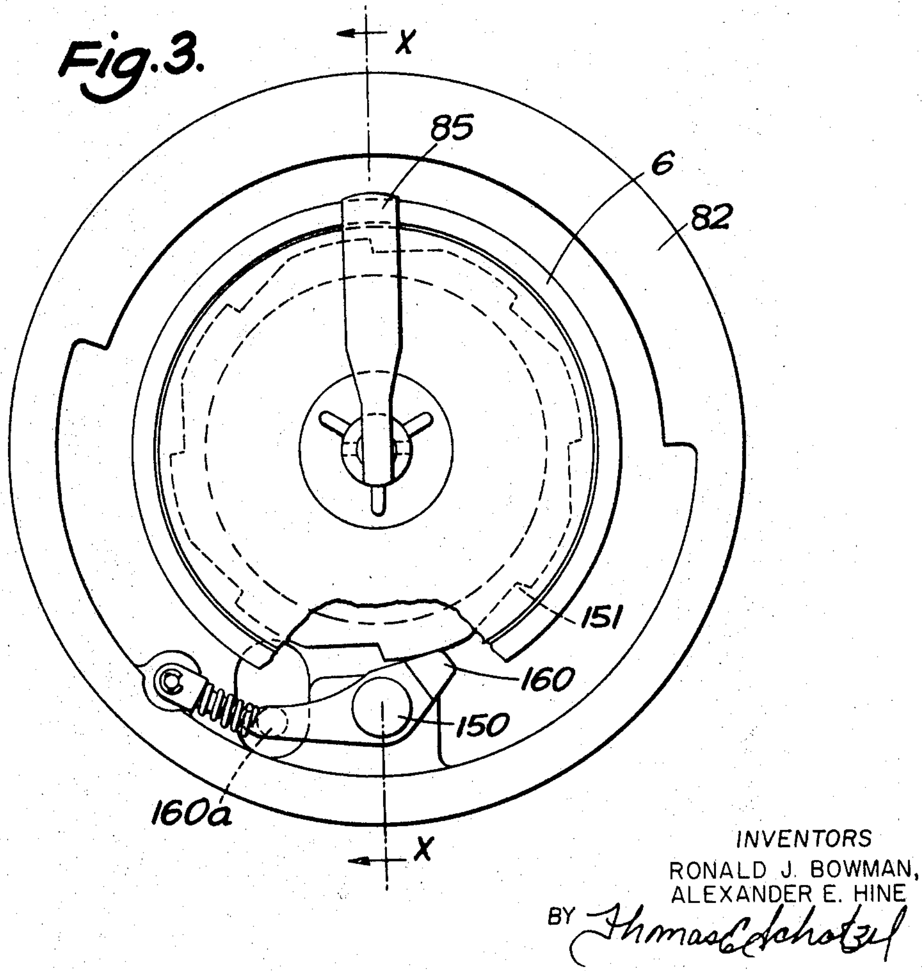
FIGS. 3 and 4 illustrate a part of the transport of FIG. 1.
Figure 4:
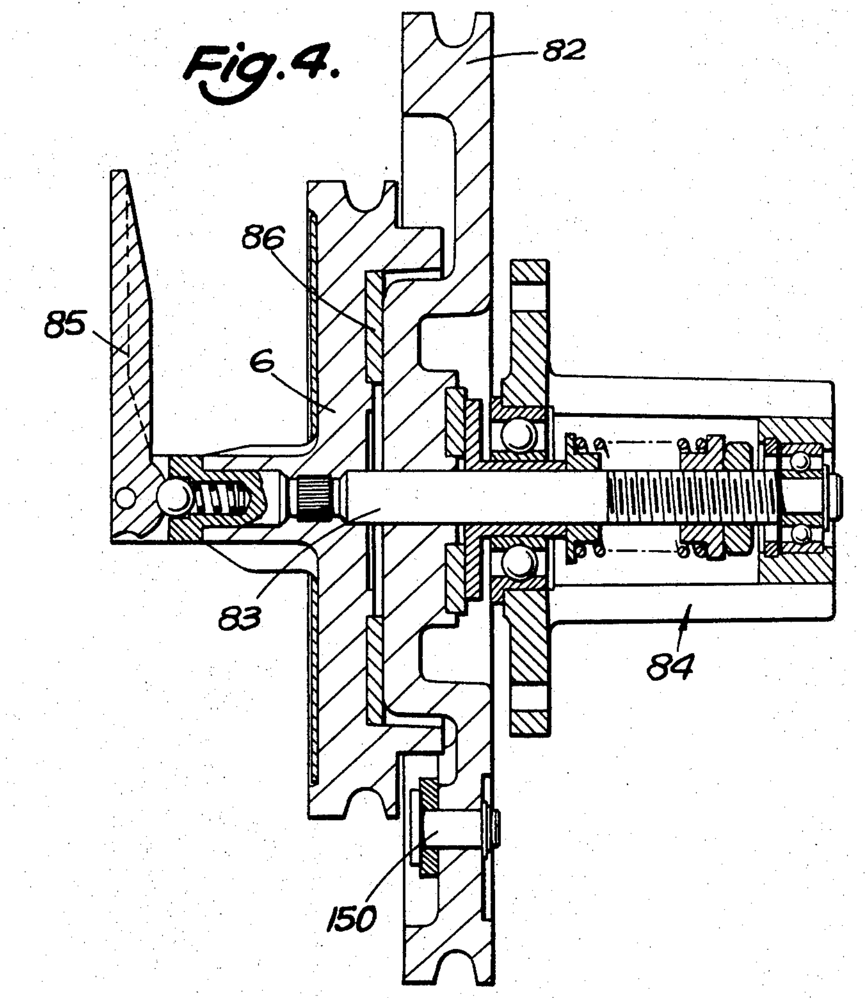

Reference may now be made to FIGS. 3 and 4 which show in simplified plan view and section (along X–X′ in FIG. 3) respectively the turntable assembly for the take-up reel. Drive for the assembly is provided by the pulley belt 2 (FIG. 2) to the drive pulley 82 which is mounted for rotation about a spindle 83 supported by a bearing assembly 84. Also mounted on the spindle 83 is the turntable 6 and above it a hinged retainer arm 85 for retaining a reel on the turntable. Between the pulley 82 and the turntable 6 is an annular felt pad 86 which constitutes the aforementioned slipping clutch. The pad is located in a shallow annular recess in the underside of the turntable and is secured thereto by a suitable adhesive.

To achieve a high spooling rate the motor power must be applied directly to the reel turntables and it is necessary to lock the turntable 6 and its associated drive pulley 82. When a fast wind mode is selected by moving plate 31 rightwards, the projection 31*a* bears against the roller 11*a* at the end of the lever 11 which by means of the link 21 causes lever 14 to rotate about its pivot 14*a*. The lever 14 is normally held in the position shown in FIG. 1 against a stop 14*b* by a spring 14*c* anchored at 14*d*. The lever 14 is linked with a cam plate 55 (rotatable about a pivot 155) by means of a link 130, so that as lever 14 rotates, cam plate 55 rotates about its pivot 155 and thereby presents a cam slope in the path of a pin 160*a* mounted on a pawl 160 which is pivoted on the pin 150 on the drive pulley 82. On rotation of the drive pulley 82 the pin 150 will ride up the cam slope and cause engagement of the pawl with the teeth 151 on the turntable 6. In this condition the pawl has moved into a toggle mode and will only disengage when the cam plate 55 has been returned to its original position and presents a further cam slope to the pawl pin.

Once the pawl has engaged it requires nearly one revolution of the drive pulley before the pin is in a position to become disengaged by the cam plate. Should the recorder be switched off or put into the rewind mode before the drive pulley has recived sufficient momentum to complete one revolution, the pawl will remain engaged. To safeguard against damage a further cam plate 53 is provided to disengage the pawl on reversal of the tape.

Finally, the movement of the fast mode plate operates, via the levers 15 and 16, one of the switches 57 to apply voltage of appropriate polarity to the motor.

For selecting the rewind mode, the selector plate 31 is caused to move towards the supply reel's side of the recorder. This applies voltage of the reverse polarity to the motor and likewise releases the brake band 37 and operates the tape lifters 32 and 33. In addition to performing the secondary functions mentioned, the movement of the selector plate for the rewind mode causes the engagement of a projection 131 with the end of the tension arm 4 (to be described in detail hereinafter) and releases the braking on turntable 5 by moving the hold brake lever 49 out of contact therewith. A clutch on the turntable 6 is left unlocked.

PULLEY DRIVE

As previously mentioned, the pulley systems 8 and 9 each comprise a first pulley which is driven by motor M and a second pulley coupled to the respective turntable. Between the two pulleys is arranged a freewheel arrangement such that drive is transmitted between the pulleys only for one respective rotational direction.

Figure 5:
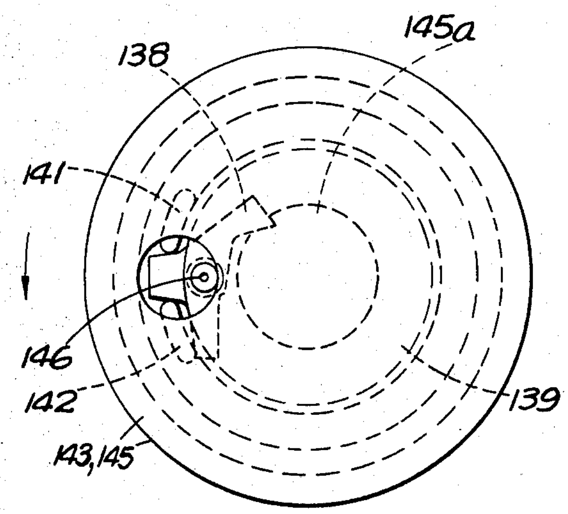
FIGS. 5 and 6 illustrate another part of the transport of FIG. 1.
Figure 6:
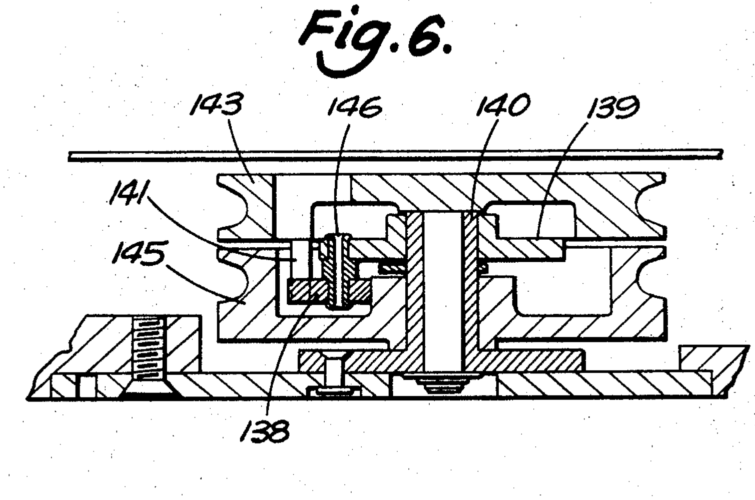

The freewheel arrangement in each pulley system is a pawl and ratchet mechanism in which the pawl is made to engage always the ratchet wheel or disengage it depending on the direction of rotation of a third member. As shown in FIGS. 5 and 6, a pawl 138 is pivoted by the pin 146 on the disc 139 which, in turn, is located so that it is free to rotate on the fixed sleeve 140 which also mounts the pulleys 143 and 145. Two pins 141 and 142 project from the pulley 143 so that they are situated on either side of a lug protruding from the pawl. When power is applied to the drive pulley 145 to rotate it in the direction of the arrow the pin 141 applies a turning moment to the pawl 138 so that it disengages from the ratchet 145*a* formed on pulley 145. Once the pawl is free of the ratchet it locks between pins 141 and 142 and the motion of pulley 143 is imparted to the disc 139. Since the disc 139 imparts a frictional drag on the sleeve 140, a force is always present on the pawl pivot in the direction opposite the motion, thereby ensuring that the turning moment remains applied to the pawl while motion of the pulley continues. This leaves the pulley 145 free to rotate in either direction. On reversing the drive to the pulley 143, pin 142 applies a turning moment to the pawl forcing it into engagement with the ratchet on pulley 145, thus locking the pulleys for conjoint movement.

TENSION BRAKING

The tension braking system comprises essentially the tension arm 4 having at one end a guide 114 over which the tape passes, the arm being mounted for rotation about the pivot 4b and carrying a wire 50 which is attached to the hold back arm 49. This arm is pivoted at 112 and carries a friction pad 113 bearing on the turntable 5. The arm provides a large mechanical advantage between the movement of the servo arm and the movement of the friction pad by virtue of the greater distance between the point of attachment of the wire 50 with the arm and the pad and the distance between the pad and the pivot 112. A spring 44a is provided to keep the pad in contact with the turntable unless the fast rewind mode is being selected.

The tension braking system is a means of maintaining the tension in the tape between the capstan and the supply reel essentially constant. It acts as a proportional servo mechanism inasmuch as the tape tension is compared with a reference and the error reduced to zero. The tension in the tape, which is directly proportional to the braking torque on the turntable 5, applies a force to the guide 114 which is transmitted via the wire link 50 to the brake lever 49 tending to rotate the brake lever 49 about its pivot. Opposing this turning moment is another applied by the reference spring 44a acting on the lever 49. Since the moment on the lever 49 produced by the spring 44 is greater than that applied by the tape tension, the lever is only held in equilibrium by its being in contact with the brake drum. Thus a force appears on the brake drum which is proportional to the difference between tension and the reference spring force. Under steady state conditions the brake lever is held in equilibrium under the action of three forces and the nominal tension in the tape is determined by the setting of the reference spring. Any tendency for the tape tension to increase or decrease will immediately affect the force on the brake drum in the opposite sense and therefore correct the tendency of the tension to vary from its normal value. It will be appreciated that any oscillatory motion of the servo arm 4 will be accompanied by variation in the braking torque applied to the supply reel, whether the arm is caused to oscillate by variations in tape tension or by eccentricity of the brake drum feeding back through the lever system. The action of the servo is however self-compensating to some degree. An increase or decrease in the tape tension acting on the arm will cause the braking torque to vary in the opposite sense thereby tending to counteract the disturbance and to keep the tension constant. The ability of the tension servo to cope with such disturbances depends on its frequency response characteristic and, therefore, on the phase relationship between the tension disturbance and the resulting braking force change.

It will be appreciated that although the servo mechanism presented by the arm 4, the hold back lever 49 and the associated parts is primarily intended for the maintenance of tape tension despite long term speed variations in the capstan or the reels, its ability to reject transient changes in tape tension is important. It may be shown that the arm exerts a considerable filtering action on transient disturbances and that with appropriate choice of dimensions and mass the arm may have a resonant frequency in the region of 2½ Hz. which is sufficiently low not to produce any undesirable flutter effect on the recording or playback.

What we claim is:

1. A magnetic tape transport having a supply reel spindle, a take-up reel spindle, a capstan driven to deliver tape to a take-up reel driven by the take-up reel spindle, a drive motor coupled by a drive coupling means for driving the capstan and supply reel spindle, and a slipping clutch having a drive member coupled for rotation with the drive coupling from the motor and a driven member coupled for rotation with the take-up reel spindle, wherein the improvement comprises a locking means including an engageable element and an engaging element, the engageable element coupled to one of said clutch members, the engaging element coupled to the other of said clutch members, and means for engaging the locking means elements to lock said clutch members to provide direct engagement of the drive member and the take-up reel spindle.

2. The magnetic tape transport of claim 1 in which the slipping clutch driven member is a turntable on which the take-up reel is mounted, the slipping clutch drive member is a plate spaced from and adjacent to a surface of the turntable, and further comprising an annular felt pad between the plate drive member and the turntable.

3. The magnetic tape transport of claim 2 in which the means for locking the slipping clutch comprises a rotatable mounted pawl for engagement with teeth coupled to the take-up reel spindle.

4. The magnetic tape transport of claim 3 in which the pawl is operated by one face of a rotatably mounted cam and in which the pawl when engaged is in a toggle mode from which it may be disengaged only by the operation of a second cam face on the said rotatably mounted cam.

5. The magnetic tape transport of claim 4 in which there is provided a second cam operable to disengage the pawl should the direction of movement of the tape be reversed before the reel spindle has completed one revolution from the position at which the pawl was actuated.

6. The magnetic tape transport of claim 5 in which there is provided in the drive system for each reel spindle enabling means for enabling a pulley to transmit drive in only one direction, said enabling means comprising a pawl and ratchet mechanism in which the pawl is arranged to always engage the ratchet member or disengage its depending on the direction of rotation of a third member.

7. The magnetic tape transport of claim 6 in which the pawl is mounted on a disc rotatably mounted between two pulleys, one of said pulleys carrying two projecting pins for actuating a lug on the pawl and the other of said pulleys carrying teeth for engagement with the pawl.

8. The magnetic tape transport of claim 1 in which the tape surfaces pass intermediate the capstan and a pinch roller mechanism adapted to urge the tape against the capstan, the pinch roller being supported by a mounting arm pivoted at one end and the other end placed within a gap intermediate a top and a spring member, said stop and spring member being supported at one end of a rotating connecting arm, such that when the connecting arm is rotated in one direction it urges the pinch roller toward the capstan and when rotated in the opposite direction it urges the pinch roller away from the capstan.

9. The magnetic tape transport of claim 8 in which the spring member is adapted to engage the mounting arm during movement of the pinch roller toward the capstan and during engagement of the pinch roller and capstan.

10. The magnetic tape transport of claim 8 in which the connecting arm extends to a solenoid such that the rotational movement of the connecting arm is responsive to the movement of a plunge of the solenoid.

References Cited

UNITED STATES PATENTS

| | | | |
|---|---|---|---|
| 2,645,495 | 7/1953 | Nelson | 274—4 |
| 2,911,162 | 11/1959 | Kyle | 242—55.12 |

LEONARD D. CHRISTIAN, Primary Examiner

U.S. Cl. X.R.

242—208